United States Patent
Eppley et al.

(10) Patent No.: US 7,277,885 B2
(45) Date of Patent: Oct. 2, 2007

(54) SYSTEMS AND METHODS FOR FILTER PROCESSING USING HIERARCHICAL DATA AND DATA STRUCTURES

(75) Inventors: Ceary L. Eppley, Carnation, WA (US); Umesh Madan, Bellevue, WA (US); David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 10/781,390

(22) Filed: Feb. 18, 2004

(65) Prior Publication Data

US 2005/0182756 A1  Aug. 18, 2005

(51) Int. Cl.
*G06F 17/30* (2006.01)
*G06F 7/00* (2006.01)
*G06F 15/16* (2006.01)

(52) U.S. Cl. ............................ 707/3; 707/2; 707/100; 709/229

(58) Field of Classification Search ................ 707/3, 707/2, 100; 709/229
See application file for complete search history.

(56) References Cited

U.S. PATENT DOCUMENTS

| | | | |
|---|---|---|---|
| 4,928,239 A | | 5/1990 | Baum et al. |
| 5,668,987 A | | 9/1997 | Schneider |
| 5,845,091 A | * | 12/1998 | Dunne et al. ............ 709/240 |
| 6,105,027 A | * | 8/2000 | Schneider et al. ............ 707/9 |
| 6,253,195 B1 | * | 6/2001 | Hudis et al. ............ 707/2 |
| 6,359,886 B1 | * | 3/2002 | Ujihara et al. ............ 370/392 |
| 6,539,394 B1 | * | 3/2003 | Calvignac et al. ............ 707/102 |
| 6,631,374 B1 | | 10/2003 | Klein et al. |
| 6,781,961 B1 | * | 8/2004 | Gunsay ............ 370/255 |
| 6,934,699 B1 | | 8/2005 | Haas et al. |
| 7,035,846 B2 | | 4/2006 | Gupta et al. |
| 2003/0123387 A1 | | 7/2003 | Jackson |
| 2003/0123456 A1 | * | 7/2003 | Denz et al. ............ 370/400 |
| 2003/0165160 A1 | | 9/2003 | Minami |
| 2003/0204664 A1 | | 10/2003 | Bennett |
| 2004/0001498 A1 | | 1/2004 | Chen et al. |
| 2004/0010752 A1 | * | 1/2004 | Chan et al. ............ 715/513 |
| 2004/0105422 A1 | * | 6/2004 | Sahni et al. ............ 370/351 |
| 2004/0111519 A1 | | 6/2004 | Fu et al. |
| 2004/0177150 A1 | * | 9/2004 | Kogan ............ 709/229 |
| 2004/0220909 A1 | * | 11/2004 | Brown et al. ............ 707/3 |
| 2004/0249682 A1 | | 12/2004 | DeMarcken et al. |

* cited by examiner

*Primary Examiner*—Etienne Leroux
*Assistant Examiner*—Cindy Nguyen
(74) *Attorney, Agent, or Firm*—Lee & Hayes, PLLC

(57) ABSTRACT

At least one implementation described herein relates to maintaining filters according to hierarchical data associated with the filters. The filters are maintained in a tree structure that is used to match inputs with filters. A filter hierarchy is an in-memory tree of string segments where each node corresponds to a string segment and references zero or more filters. When an input is received, a path associated with the input is parsed into string segments and the tree is traversed according to the string segments to locate nodes that match the input (primary matching). The input is then compared to filters referenced by matching nodes to locate filters that match the input (secondary matching). As a result, the input is tested against significantly fewer filters and greater efficiency is achieved over typical systems. Also, the primary matching process returns filters in a sorted order which facilitates the secondary matching process.

24 Claims, 6 Drawing Sheets

Exemplary Filter Hierarchy

Exemplary Filter Hierarchy

PRIMARY MATCHING

SECONDARY MATCHING

SYSTEMS AND METHODS FOR FILTER PROCESSING USING HIERARCHICAL DATA AND DATA STRUCTURES

TECHNICAL FIELD

The systems and methods described herein generally relate to data processing using filters and, more particularly, to systems and methods for filter processing using hierarchical data associated with the filters and hierarchical data structures.

BACKGROUND

Computing systems—i.e. devices capable of processing electronic data such as computers, telephones, Personal Digital Assistants (PDA), etc.—communicate with other computing systems by exchanging data messages according to a communications protocol that is recognizable by the systems. A system utilizes filters to analyze messages that are sent and/or received by the system and to determine if and how the messages will be processed further.

Filters are used to process a diverse assortment of documents and messages. Data processed by filters is frequently arranged in a hierarchical manner, generally as a result of an addressing or naming system that is used to uniquely identify or locate the data. For example, Internet resources are named according to Universal Resource Identifiers (URI) that reflect a hierarchical structure. The URI "http://www-.mycorp.com/products" identifies a web page called "products" that is hosted on "www.mycorp.com" and is organized according to a particular URI scheme ("http"). In this particular example, "http" is a root of the hierarchy, "www-.mycorp.com" is a subordinate of the root, and "/products" is a subordinate of "www.mycorp.com".

In addition to Internet resources, a distributed system frequently utilizes hierarchical namespaces as a natural way to organize and express the topology of system resources such as servers, printers, etc. For example, the following hierarchical name scheme is a natural and convenient way of organizing MyCorp's web servers:

http://www.mycorp.com/machines/wa/seattle/server1.

In this particular example, the namespace utilizes the hierarchical structure to identify particular resources ("machines") in particular geographical areas ("wa" and "seattle"), which is a common scheme.

Whenever data is organized hierarchically, decision logic used to process the data also develops a hierarchical flavor. Thus, in the previous example, a corporation ("MyCorp") may develop a set of data processing rules that apply to machines regardless of the city and state in which the machines are located by orienting the rules about the name prefix "http://www.mycorp.com/machines". Another set of data processing rules that apply specifically to machines located in Washington would utilize the name prefix http://www.mycorp.com/machines/wa".

A common application that uses processing rules based on name prefixes is message routing. Message routers store route tables that are comprised of filters and destinations, a destination being associated with each filter. To route a message, a router matches the message against its internal filter table to produce a set of matching filters. The router then forwards the message to the destinations associated with each matching filter.

Such a router is relatively inefficient because the message router must try every input against each filter stored in the route table. Since route tables typically contain thousands of entries, the process of comparing an input with each and every filter can consume significant time and resources. If the number of comparisons is reduced, then the process would become more efficient.

Another problem is that, since multiple routes (i.e. filters) in a route table have overlapping scope, it is not uncommon for an input to match multiple filters. All matching filters that match a given input are returned in no particular order. If an order can be established and the results returned according to that order, then processing could be streamlined even further.

SUMMARY

At least one implementation described herein relates to filter processing according to hierarchical data associated with the filters. The filters are maintained according to a tree structure (i.e. a filter hierarchy) that is used to match inputs with filters. A filter hierarchy is an in-memory tree of string segments where each node of the tree corresponds to a string segment of the hierarchical data and references zero or more filters. Each string segment of a filter path corresponds with a level in the tree. When an input is received, a path (i.e. the hierarchical data) associated with the input is parsed into string segments and the tree is traversed according to the string segments to locate nodes that match the input (primary matching). The input is then compared to filters referenced by the matching nodes to locate filters that match the input (secondary matching). As a result, the input is tested against significantly fewer filters and greater efficiency is achieved over typical systems.

Depending on the particular implementation, the filter hierarchy may be traversed from top to bottom or bottom to top in the matching process. If matches deeper in the hierarchy take precedence over matches higher up, then matching begins at the bottom of the hierarchy and proceeds toward the top of the hierarchy. Conversely, if shallow matches are preferred, the matching begins at the top and proceeds downward. No matter which direction the matching proceeds, matching filters are returned in an order in which they were encountered in the hierarchy. As a result, subsequent processing of the matching filters is more efficient.

BRIEF DESCRIPTION OF THE DRAWINGS

A more complete understanding of exemplary systems and methods described herein may be had by reference to the following detailed description when taken in conjunction with the accompanying drawings wherein.

DETAILED DESCRIPTION

The present disclosure relates to organizing filters hierarchically and processing hierarchical data according thereto. Filters are stored in a hierarchical data structure that is tiered according to string segments contained in a segment path associated with the filters and/or the hierarchical data. The systems, methods and computer-readable media described herein provide a way in which a number of filters against which an input is tried is significantly reduced, thereby saving processing time and system resources.

Filters are stored in a tree structure that includes zero or more filters at each node. Each node represents a string segment in hierarchical data (such as a namespace) and each level of the tree corresponds to a string segment position in the hierarchical data. When an input is received, hierarchical data associated with the input is parsed into string segments and the tree is traversed according to the string segments. When one or more nodes that correspond with the input are located, any filters associated with the nodes are compared with the input to determine if the input matches any of the filters.

By trying the input only against filters contained in a subset of the tree nodes instead of all the filters stored in the system, the number of tries is significantly reduced—on the order of hundreds or thousands. As such, the presently described systems and methods are an improvement over the prior art.

In addition, matching nodes are encountered in a particular order depending on a traversal algorithm that is utilized. For example, if a top-down traversal algorithm is used, nodes will be encountered according to a length of an input prefix, with a shortest prefix being encountered first and a longest prefix being encountered last. Matching nodes can be returned in the order in which they were encountered thus simplifying subsequent processing of the matching nodes.

In at least one implementation, a filter engine uses XPath filters and input data is structured according to the extensible Markup Language (XML) data format. This combination works particularly well since these formats are hierarchical in nature. However, the techniques described herein may also be utilized with other hierarchical formats.

Exemplary Data Structure

Figure 1:
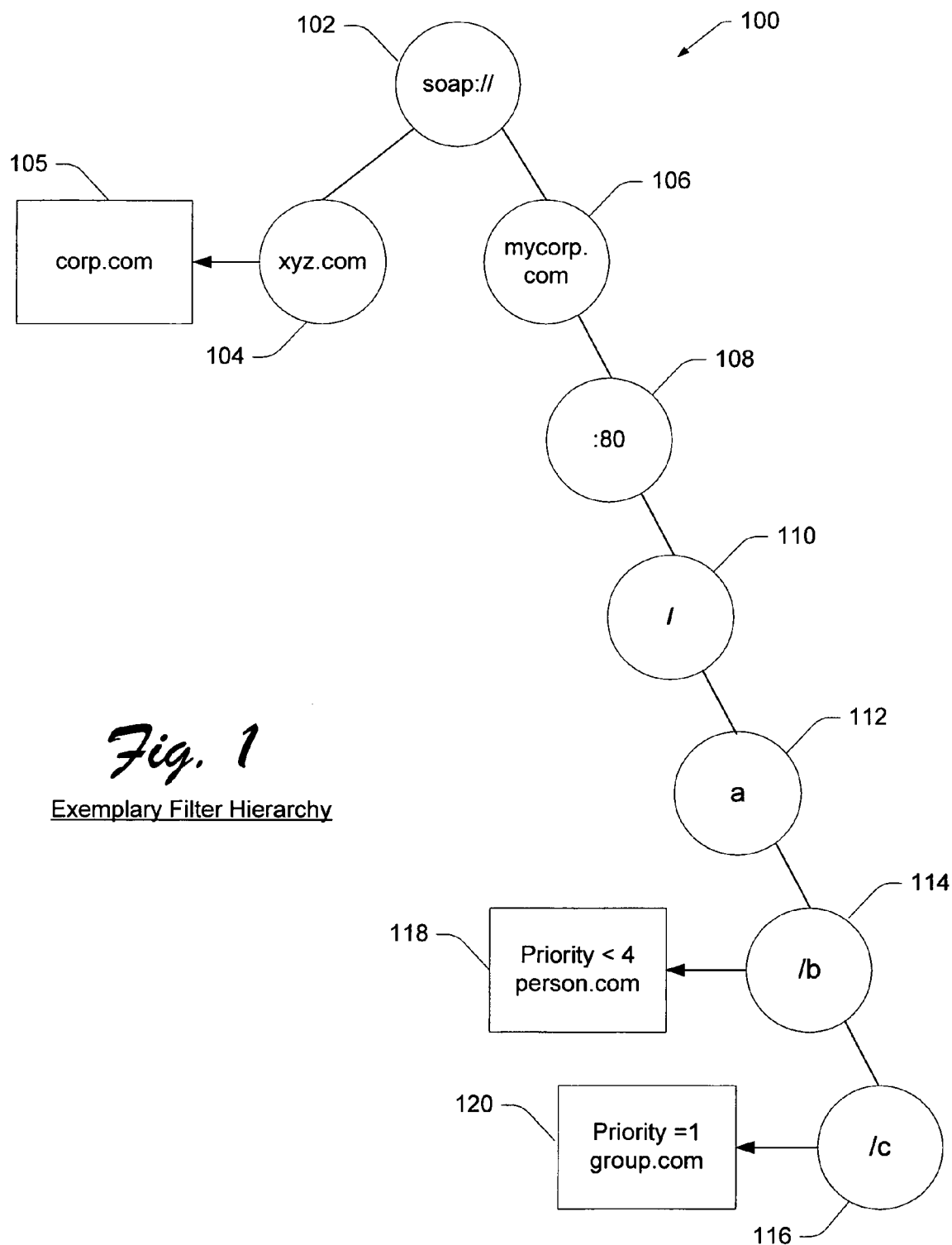
FIG. 1 is an illustration depicting filter storage according to a hierarchical arrangement.

FIG. 1 is an illustration depicting filter storage according to a hierarchical arrangement. FIG. 1 shows an exemplary filter hierarchy depicted by a filter tree 100. The filter tree 100 represents filters associated with two pathnames and several subsets thereof. A first pathname represented by the filter tree 100 is soap://xyz.com:35. A second pathname represented by the filter tree 100 is soap://mycorp.com/a/b/c. One subset of the second pathname is soap://mycorp.com/a. Other subsets are included in the second pathname.

A root node 102 includes a first segment of each pathname, namely, "soap://". According to FIG. 1, all inputs received for the filter tree 100 will begin with this first segment. It is noted that a root node may be a blank node or a null node that represents a unity of dissimilar first segments of inputs that may be received for a particular filter tree. For example, if the filter tree 100 were also configured to received inputs having a first segment of "http://" then a blank root node would exist and that root node would include a first child node—"http://"—and a second child node—"soap://". However, that is not the case depicted in the present example.

In the present example, the root node 102 includes a first child node 104 and a second child node 106. Each child node 104, 106 represents a unique segment that appears in a similar position of an input. Here, the first child node 104 references a segment from the first pathname, namely "xyz.com". An input that includes the string "soap://xyz.com" would match the first child node 104. The first child node 104 also has a child node 105 that references a second segment from the first pathname, ":35" (a port identifier). An input that includes the string "soap://xyz.com" would match child node 105.

Similarly, the second child node 106 references a segment from the second path name ("mycorp.com") that is located in a similar position within the pathname as "xyz.com". Since both segments are located in a similar position within the pathname, the segments are represented in a same level in the filter tree 100. An input that includes the string "soap://mycorp.com" would match the second child node 106.

The second string ("soap://mycorp.com/a/b/c") has five string segments following the segment represented by the second child node 106 ("soap://mycorp.com"). The five string segments are ":80" (the default port for HyperText Transmission Protocol (http) which is used by soap (simple object access protocol; since it is a default port, it does not appear in the string)) messages, "/", "a", "/b" and "/c". Each of these string segments is represented by a node in the filter tree 100. Node 108 represents ":80" and node 110 represents "/". Node 110 is subordinate to node 108 since ":80" appears before "/" in the associated string.

Since "a" appears before "/b" and "/c", a node 112 representing the segment "a" is located subordinate to the node 110 representing the "/" string segment. The string segment "/b" appears subsequent to the string segment "a" so a node 114 corresponding to the "/b" string segment is subordinate to the node 112 that represents the "a" string segment. Similarly, a node 116 representing the "/c" string segment is shown subordinate to the node 114 representing the "/b" string segment since the "/c" string segment occurs subsequent to the "/b" string segment.

Filters are stored and referenced by individual nodes in the filter tree 100. A particular node in the filter tree 100 may have multiple filters associated with it, but any particular node may not have any filters associated therewith. In addition, a node may have application data associated therewith that is a set of instructions that are executed if a filter associated with the node is satisfied by an input.

In the present example, node 114 has a filter 118 associated with it that includes a condition of "Priority <4" and application data that is a server designation of "person.com". When an input including "soap://mycorp.com/a/b" is tried against the filter tree 100, it will match node 114. The application data of filter 118 will then be executed if the input satisfies the condition (i.e. if the input has a priority that is less than four) and the input will be forwarded to "person.com".

Similarly, node 116 has a filter 120 associated therewith. Filter 120 includes a condition of "Priority=1" and application data that is a server designation of "group.com". When an input including "soap://mycorp.com/a/b/c)" is tried against the filter tree 100, it will match node 116. The application data of filter 120 will then be executed if the condition—a priority that is equal to one—is satisfied. The input will be forwarded to the "group.com" server.

To better illustrate the prefix matching nature of the described implementations, consider the following input:

soap://mycorp.com/a/b/d/e Priority=3

Here, the tree would be traversed down to node 114 ("b") and the filter 118 associated with node 114 would be tested against the input since no further segment of the input matched a node lower than "b". Since the priority of the input is less than four (i.e. the filter evaluates to true), the input would be forwarded to person.com. However, in some implementations, it may be advantageous to consider only exact matches. In this instance, there is no exact match.

Node 104 also has a filter 105 associated with it. The application data associated with filter 105 only includes a server designation ("corp.com") but no conditional rule. This situation may be viewed as filter 105 being the server designation, or that filter 105 has no filter but has an instruction set that is executed when an input matches node 104. Furthermore, for representational purposes, it may be said that filter 105 includes a null filter with application data of a server designation. An input including "soap://xyz.com" that is tried against the filter tree will simply be forwarded to "corp.com".

Exemplary String Segment and Associated Data Structure

Figure 2A:
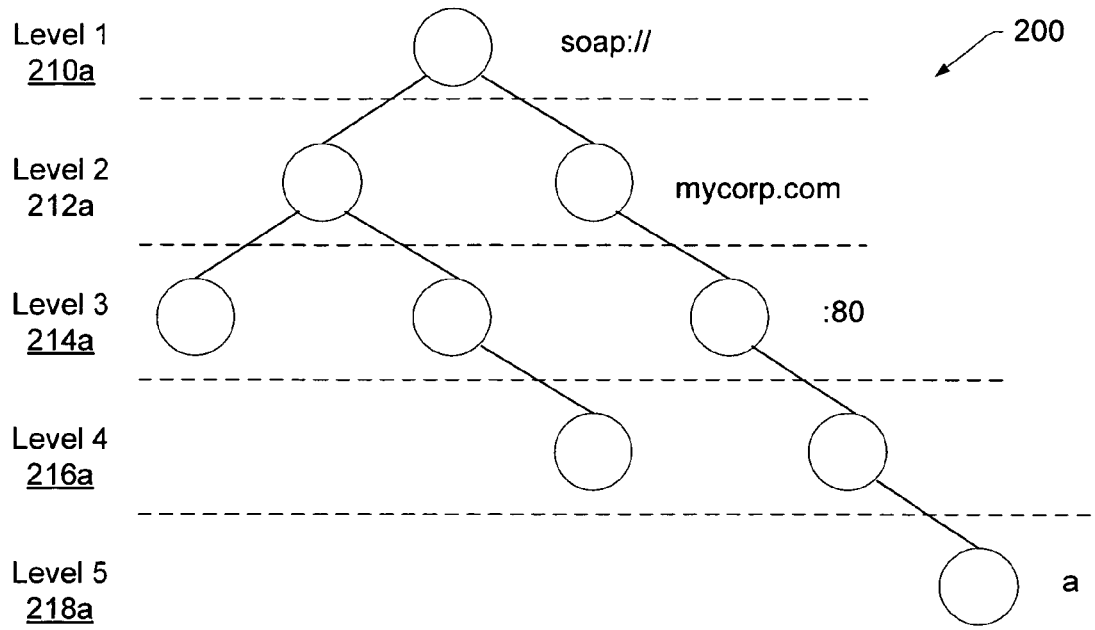
FIG. 2a is a diagram of an exemplary tree data structure representation.
Figure 2B:
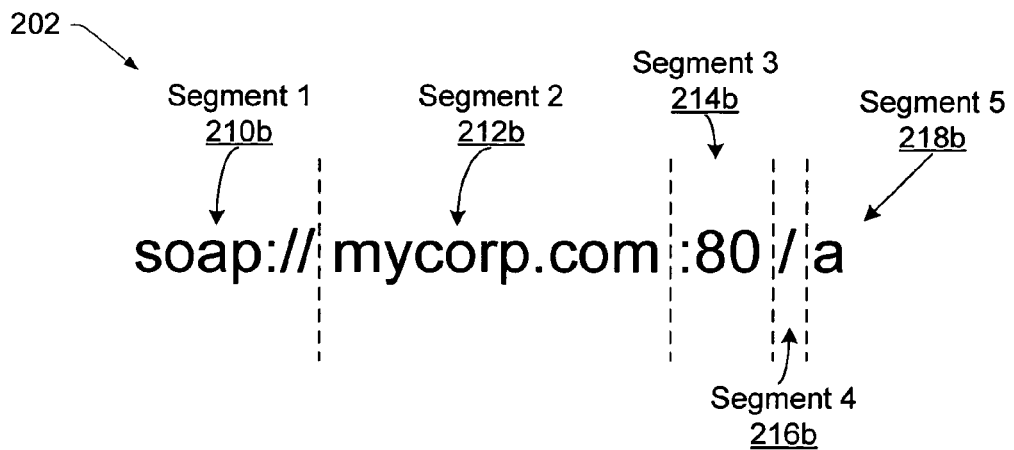
FIG. 2b is a depiction of a message having multiple segments.

FIG. 2a and FIG. 2b illustrate how filter tree levels correspond to data item segments. FIG. 2a is a diagram of an exemplary hierarchical data structure representing a filter tree 200. FIG. 2b is a depiction of a data item 202 having segments ordered according to a hierarchical scheme. The filter tree 200 includes multiple levels that each correspond to a segment of the data item 202.

The filter tree 200 includes a first level 210a that has a root node; a second level 212a that contains child nodes of the root node; a third level 214a that is subordinate to the second level 212a; a fourth level 216a that is subordinate to the third level 214a; and a fifth level 218a that has bottom nodes and is subordinate to the fourth level 216a.

The data item 202 includes a first segment 210b ("soap://") that corresponds with the root node in the first level 210a of the filter tree 200. The data item 202 also includes a second segment 212b ("mycorp.com") that occurs subsequent to the first segment 210a and that corresponds with the second level 212a of the filter tree 200. In other words, the second segment 212b would be associated with a node in the second level 212b of the filter tree 200.

The data item 202 also includes a third segment 214b (":80"), a fourth segment 216b ("/") and a fifth segment 218b ("a") that correspond with the third level 214a, fourth level 216a and fifth level 218a, respectively, of the filter tree 200. In this and other examples, the order in which a segment appears in a data item determines the level in a filter tree that is associated with the segment.

The advantages of such a corresponding relationship between hierarchical data items and hierarchical filter data structures will be seen below, when further aspects of the present systems and methods are described in greater detail.

Exemplary Computer System

Figure 3:
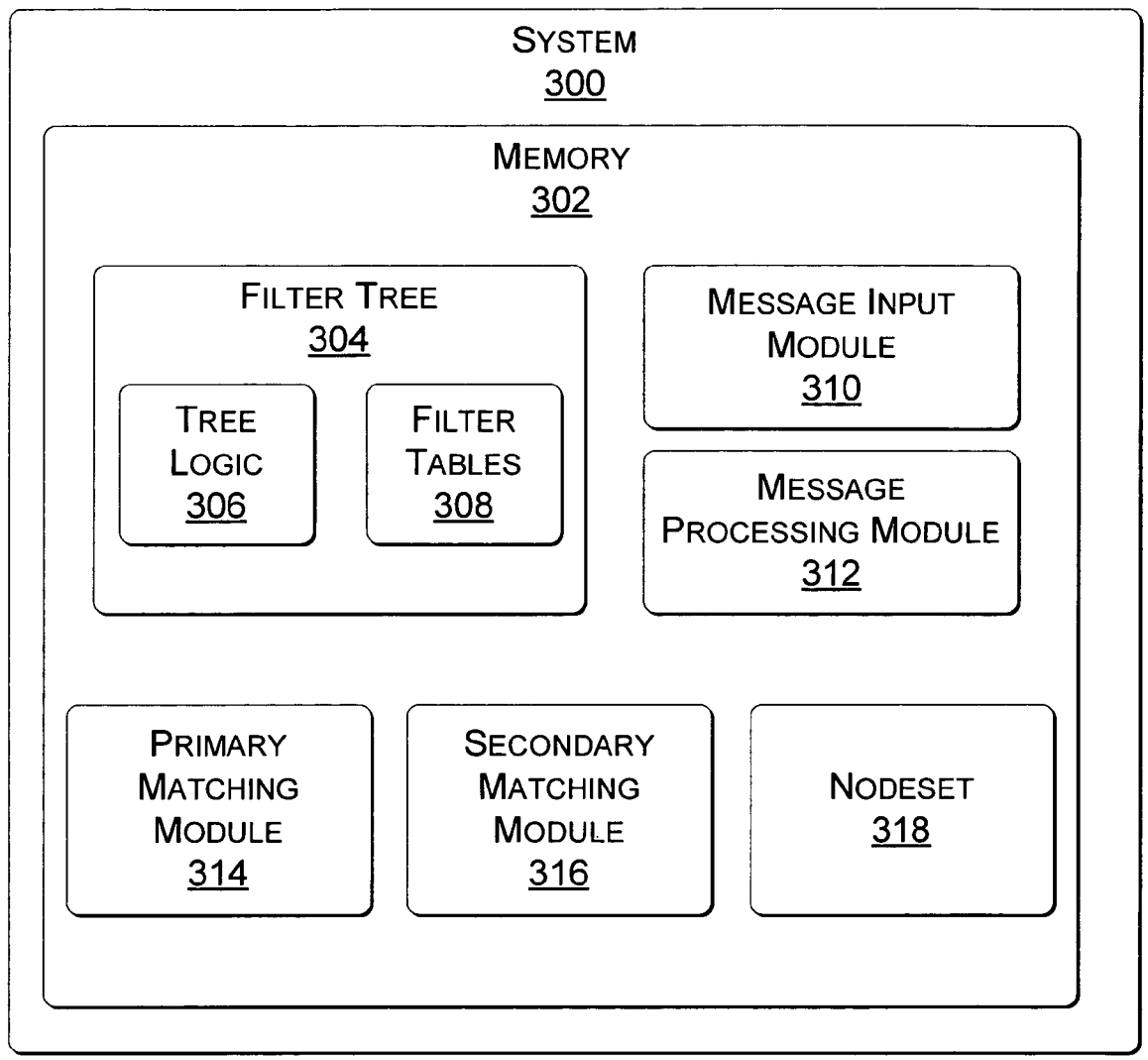
FIG. 3 is a block diagram of an exemplary computer system.

FIG. 3 is a simplified block diagram of a computer system 300 showing key components described herein. It is noted that the computer system 300 includes other components than those shown, i.e. components typically found in computer systems. However, only elements particularly related to the systems and methods described herein are depicted. It is also noted that the elements shown in FIG. 3 may be implemented as hardware components, software modules or a combination thereof.

The system 300 includes memory 302 that stores a filter tree 304 representation that has a tree logic component 306 and a filter tables component 308. The tree logic component 306 includes the logic required to build and maintain the filter tree 304 and the filter tables component 308 includes one or more filters referenced by the filter tree 304.

It is noted that although the filter tables 308 are shown resident in memory 302, filter tables used by the system could be stored in remote memory and swapped into memory 302 as needed. It is also noted that it is possible that a message being streamed into the system 300 may never be completely resident in the memory 302 at one time. In such a case, filtering could be performed on a front-end of the message (such as a header section) and the stream redirected to another process based on the result of the filtering.

The memory 302 also stores a message input module 310 and a message processing module 312. The memory further includes two matching modules, namely a primary matching module 314, a secondary matching module 316 and a nodeset 318.

The message input module 310 is configured to receive a data transmission containing an input to try against filters in the filter tree 304. The message processing module 312 is configured, inter alia, to parse the input into distinct portions that correspond to a hierarchy of the filter tree 304. In the case of a message, the message processing module 312 is configured to parse the message into its constituent segments for subsequent matching procedures.

Other functions attributable to the message processing module 312 (such as precedence processing, etc.) will be discussed in greater detail below, with respect to subsequent figures.

The primary matching module 314 is configured to locate nodes in the filter tree 304 that match segments contained in an input message. The secondary matching module 316 is configured to compare the input message used in the primary matching procedure to one or more filters referenced by the matching nodes identified in the primary matching procedure.

By separating the matching process into primary and secondary procedures performed by the primary matching module 314 and the secondary matching module 316, respectively, a particular input must only be tried against filters identified by the secondary matching module to determine all matches between the input and the filters in the filter tree. By eliminating a vast majority of matching attempts between the input and the non-matching filters, the efficiency of the matching process is greatly enhanced.

Methodological Implementation: Exemplary Primary Matching

Figure 4:
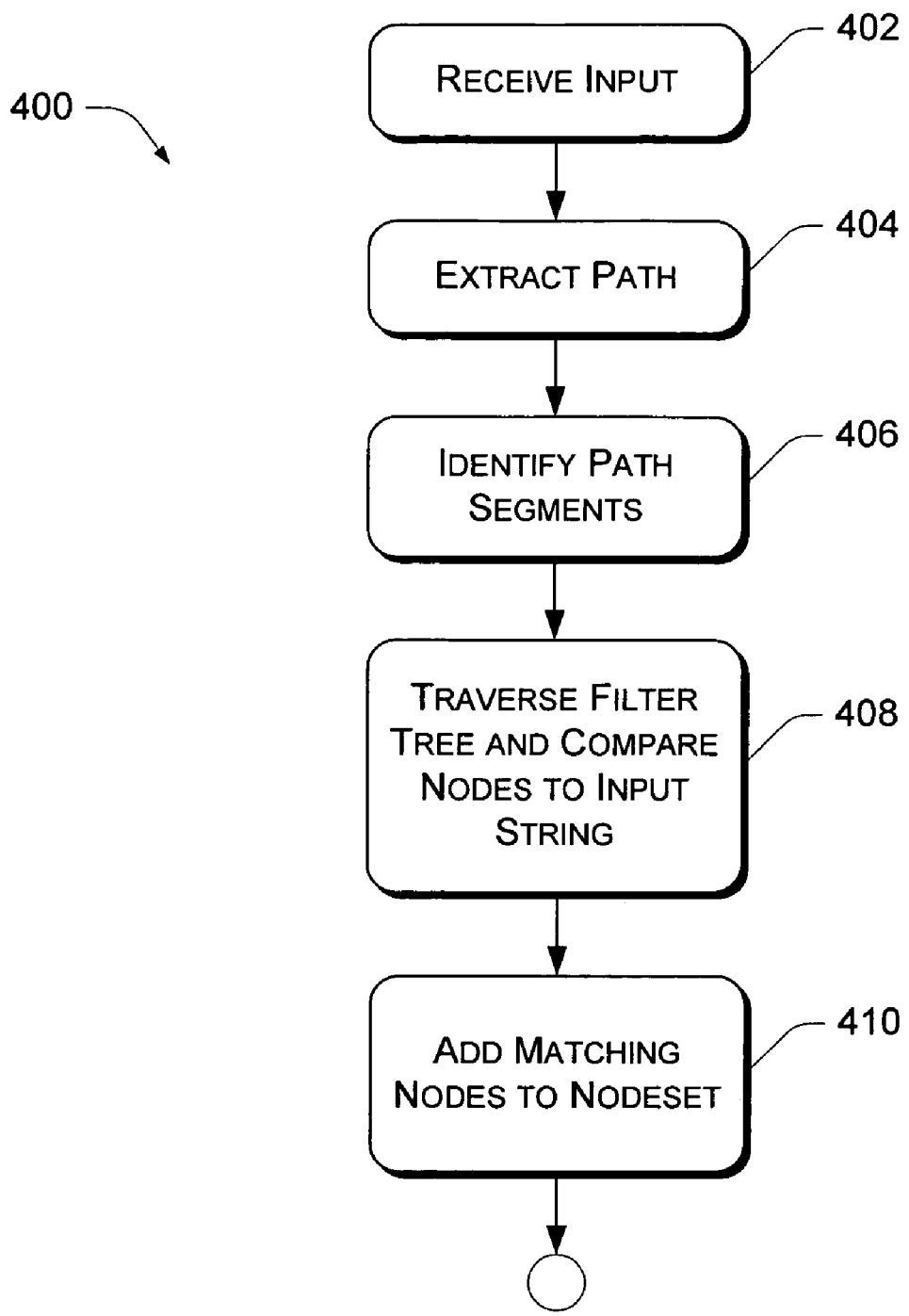
FIG. 4 is a flow diagram that depicts a methodological implementation for a primary matching process as described herein.

FIG. 4 is a flow diagram 400 depicting an exemplary primary matching process to locate one or more nodes in a filter tree that correspond to segments included in an input having a hierarchical structure. In the following discussion, continuing reference will be made to the elements and the corresponding reference numerals included in previous figures.

The following example relates to a messaging system that receives input messages and compares the input to several filters to determine filters that match the input. However, it is noted that other types of systems can utilize the methodology presented herein.

Also, it is noted that function may be attributed to a particular element for purposes of this discussion. However, such attribution does not necessarily limit the function to that particular element. Any function discussed in the following methodological implementation may be performed by any component capable of performing such a function.

At block 402, an input is received by the message input module 310 (FIG. 3). The message input module 310 identifies a hierarchical string contained in the input (block 404) and passes the string to the message processing module 312, which parses the string into identifiable string segments at block 406.

At block 408, the primary matching module 314 traverses the filter tree and compares the segments (see FIG. 2a) with filter tree nodes in corresponding filter tree levels (see FIG. 2b) to determine if any filter tree nodes match the hierarchical string of the input message. The details of the filter tree traversal are not described in detail herein. Tree traversal algorithms are known in the art and may be used with the present systems and methods.

The traversal begins with a root node and progresses through each filter tree branch as long as matching nodes are encountered. Once a non-matching node is encountered in a filter tree branch, further traversal of that branch is not required, since no nodes that occur after the non-matching node can match the input string. This is one aspect of the present invention that increases efficiency of a filter engine process.

Additionally, new levels of the tree are not traversed if there is no string segment that corresponds to the new levels. For example, if a string only has three string segments, there is no need to traverse tree levels from a fourth level and below.

Any nodes discovered during the traversal that match a corresponding segment of the input string are added to the nodeset 318 (block 410). Further processing takes place using only the nodes included in the nodeset 318. This is another aspect of the present invention that preserves system resources, since filter matching is only performed on a subset of tree nodes.

In at least one implementation, only nodes that are associated with a filter (or more than one filter) are added to the nodeset. After a node is found to match an input, a check is made as to whether a filter is referenced by the node. If so, then the node is added to the nodeset; otherwise, it is not.

Methodological Implementation: Exemplary Secondary Matching

Figure 5:
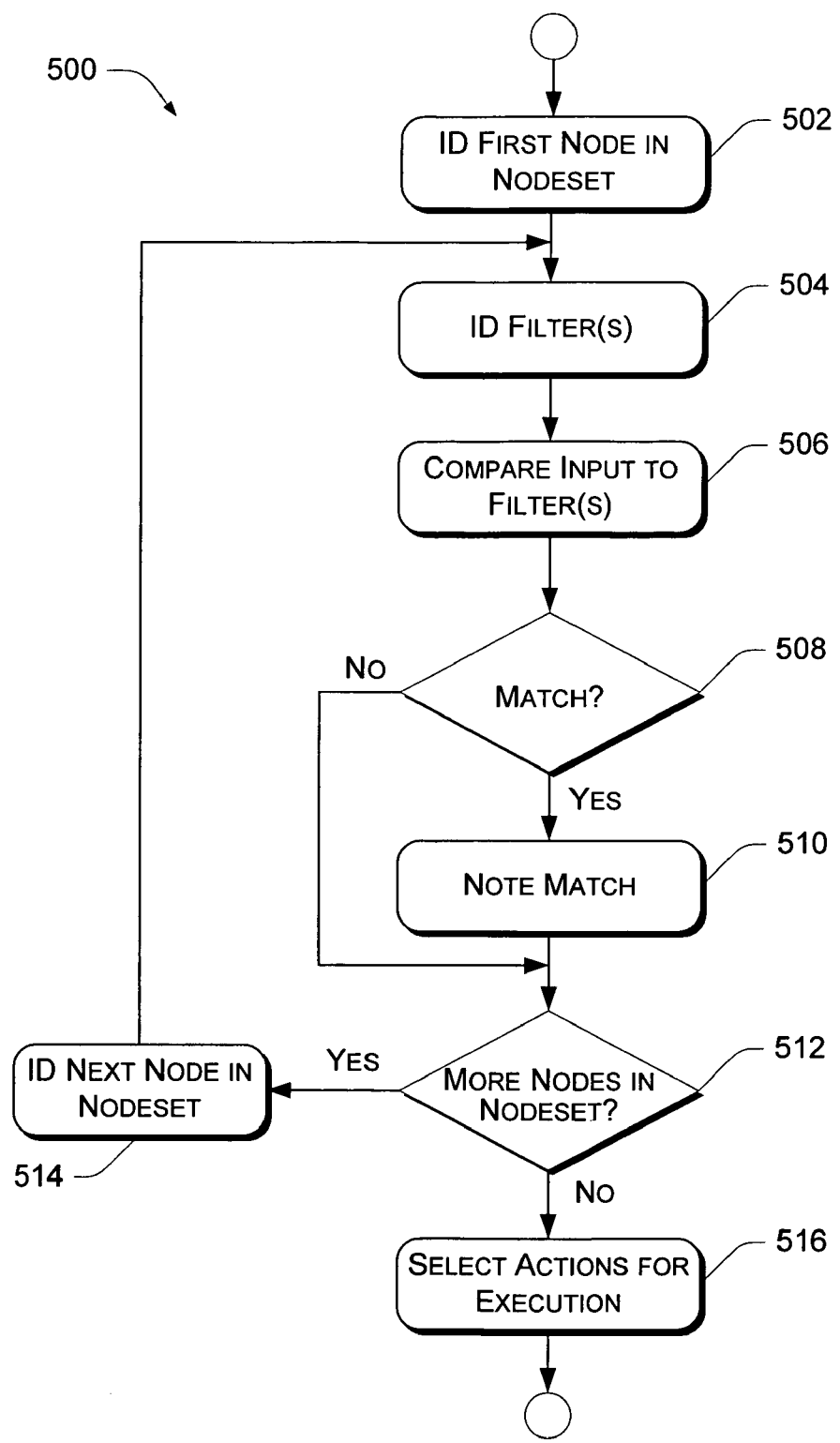
FIG. 5 is a flow diagram that depicts a methodological implementation for a secondary matching process as described herein.

FIG. 5 is a flow diagram 500 that depicts an exemplary methodological implementation of a secondary matching process. In the following discussion, reference will be made to elements and reference numerals shown in previous figures.

At block 502, the secondary matching module 316 identifies a first node stored in the nodeset 318. The secondary matching module 316 then identifies one or more filters associated with the node at block 504. For example, referring to the example shown in FIG. 1, if the first node in the nodeset 318 identifies node 114, then the secondary matching module 316 would identify filter 118 at block 504.

At block 506, the secondary matching module 316 compares the input to the filter(s) identified in block 504 to determine if the input satisfies any of the filters. If a filter is found that satisfies the input ("Yes" branch, block 508), then the secondary matching module 316 notes the match at block 510, typically by caching a reference to the node, filter or action.

If there is no match ("No" branch, block 508) or after a match has been noted (block 510) there are more nodes in the nodeset ("Yes" branch, block 512), then a next node in the nodeset 318 is identified at block 514 and the process 11 reverts to block 504 to identify node filters and compare the input to the filters. When there are no unprocessed nodes remaining in the nodeset 318 ("No" branch, block 512), the secondary matching module selects one or more actions from the matching nodes and executes the action(s) (block 516). The action(s) taken may include selecting only one action at random or selecting one or more of the actions based on a predetermined methodology.

The steps described above are but one part of a particular implementation of the secondary matching process wherein the actions of matching filters are executed as they are identified. In another implementation which may better suit some applications, the secondary matching module 316 executes an action associated with a filter upon determining that an input satisfies the filter. In other words, the actions are taken during the iteration through the nodeset instead of after all the nodes have been processed.

The above implementation might be used by an application that enforces security policy that is applied in a hierarchical manner. Each filter may correspond to a policy that has to be enforced. Therefore, all matching filters would need to be identified.

In yet another implementation of the secondary matching process, the nodes in the nodeset 318 may be processed only until a match is identified. The processing may begin from the top or the bottom of the nodeset, i.e. the top or bottom of the filter tree. Such an implementation might be used starting at the bottom and working backwards for a routing system that defines default routes at higher nodes to catch messages that do not match more specific routes defined at lower levels.

Implementing the filter matching process as described above obviates the need to match an input against each and every filter in a filtering system. The only comparing of an input to individual filters occurs in the secondary matching process after the primary matching process has eliminated a significant number of filters from the possibility of matching the input. This saves significant system resources over other methods.

Precedence Considerations

One issue that arises with hierarchical data items such as namespaces is that one input may match more than one namespace or filter. For example, consider an enterprise that defines rules that apply to enterprise machines according to name prefixes (as in the example previously discussed).

Precedence rules would have to be defined by the enterprise to settle particular issues. For example, would rules for http://www.mycorp.com/machines always take precedence over http://www.mycorp.com/machines/wa/seattle? Would a rule defined for the prefix http://www.mycorp.com/machines apply to every machine whose name begins with that prefix? Does a rule specific to http://www.mycorp.com/machines/wa/seattle take precedence over a more general rule for http://www.mycorp.com/machines/wa?

Typically, a precedence algorithm is based on either a longest prefix or a shortest prefix basis. A longest prefix precedence would mean that a more specific rule would take precedence over a more general rule. Accordingly, a shortest prefix precedence would give precedence to the more general rule.

As previously discussed, a common usage of name prefix based grouping of processing rules is in message routing systems. Message systems contain route tables made up of filters, with each filter having an associated destination. To route a message, a router matches the message against its internal filter table to produce a set of matching filters. It then forwards the message to the destinations associated with each matching filter.

Message routers route messages to Web services and locations, which are addressed and located using URIs. It is possible for multiple routes (filters) in a single message routing system to have overlapping scope. It is not uncommon for a message to match multiple routes.

EXAMPLE

Referring back to FIG. 1, it can be seen that filter 116 represents the following rule (hereinafter "Route 1"): if a message "To:" begins with soap://mycorp.com/a/b and has a priority that is less than four (4), forward the message to person.com. Furthermore, filter 118 represents the following rule ("Route 2"): if a message "To:" begins with soap://mycorp.com/a/b/c and has a priority equal to one (1), route the message to group.com. Finally, filter 114 represents a rule ("Route 3") of: if a message "To:" begins with soap://xyz.com, route the message to corp.com regardless of the priority.

Given an input message "To: soap://mycorp.com/a/b/c" having a priority of one (1), a router would select two routes: Route 1 (filter 116) and Route 2 (filter 118). That in itself may be acceptable, but what if the router were required to pick a single route?

If a precedence rule mandated that a route with the shortest prefix be selected, then Route 1 would be the only route deemed to match the input message. This is because Route 1 has a shorter prefix than Route 2—"soap://mycorp.com/a/b" vs. "soap://mycorp.com/a/b/c".

According to the methodologies present herein, a primary matching step could traverse the filter tree 100 to determine a set of nodes that (a) have filters 1 and/or application data associated therewith; and (b) match the input. This step would derive node 110 and node 112 as matching nodes. Node 106 and node 108 would not match because they do not have any filter or data associated with them. Node 104 would not match because the input message string segment does not match "soap://xyz.com".

A router or application would then apply a precedence rule to determine which specific filters should be tried (as part of the secondary matching process described above). Using the shortest prefix precedence rule, Route 1 (filter 116) would be selected because it has the shortest matching prefix, namely, "soap://mycorp.com/a/b" (node 110).

Although not clearly obvious in this particular example due to the limited number of filters shown, when a filter tree containing hundreds or thousands of filters is considered, the reduction in resource requirements become apparent. This technique is more efficient that a typical technique that would try the input against all filters in the filtering system.

Exemplary Matching Algorithm with Precedence Considerations

The following exemplary matching algorithm is described in pseudo code to better demonstrate the techniques described herein. The following examples include algorithms for shortest prefix precedence and for longest prefix precedence.

```
internal HierarchyNodeCollection Match (string[ ] segments
{
    HierarchyNodeCollection matches = new
FilterHierarchyNodeCollection( );
    HierarchyNode node = this.Root;
    if (node.HasFilters)
    {
        matches.Add(node);
    }
    // Loop over each segment
    foreach (string segment in segments)
    {
        //For each segment, find a child node that has a matching
segment
        HierarchyNode match = node.Find(segment);
```

```
        If (null != match && match.HasFilters)
        {
            matches.Add(match)
        }
        else
        {
            break; //no match. Traversal stops
        }
    }
    return matches.
}
```

The preceding pseudo code traverses a filter tree starting with the root node. The matching nodes are returned in the order they occur in the tree, starting at the root and down. To give precedence to shortest prefix matches, the application must perform the following steps:

```
FilterCollection filters = null;
int i = 0;
do while (filters == null && i < matches.Length)
{
    filters = matches[i].Match(input);
    i = i + 1;
}
```

This selects the first matching node (the node having a shortest prefix) and asks the filter hierarchy to perform a second pass of the input data. The hierarchy will test all filters references by the first matching node against the input and return filters that match.

To give precedence to the longest prefix matches, the application performs:

```
FilterCollection filters = null;
int i = matches.Length-1;
do while (filters == null && i >= 0)
{
    filters = matches[i].Match(input);
    i = i - 1;
}
```

This selects the last matching node (the node having the longest prefix) and asks the filter hierarchy to perform a second pass on the input data.

To perform other precedence rules, an application can loop over the returned matches and perform whatever action is preferred.

Adding and Removing Filters to/from a Filter Hierarchy

Adding filters to a filter hierarchy and removing filters therefrom follows similar logic as outlined above. To add a filter to a filter hierarchy, a hierarchically structured segment string that is associated with the filter is used to locate a nearest matching node in the filter hierarchy, i.e. a filter tree.

The filter tree is traversed according to the segment string, as explained above. If an existing node is found that matches the segment string, the associated filter is added to the node. In other words, the node is made to reference the new filter along with any other filters that the node may already reference.

If there is no existing node that matches the segment string exactly, the lowest level node in the filter tree that matches a segment in the segment string is located by traversing the filter tree. A child node is created for that lowest level node that corresponds with a string segment that is immediately subsequent to the last matching string segment.

If the child node (i.e. the new node) corresponds with a final string 11 segment, then a filter and application data associated with the segment string is associated with the child node. If there is another subsequent string segment, then a grandchild node from the lowest level matching node is made subordinate to the new child node created above. If the grandchild node corresponds to a final string segment, then the grandchild node is made to reference the filter and application data associated with the segment string.

This process continues until a final string segment in the segment string has been accounted for.

The following pseudo code addresses the previous steps.

```
//
// PSEUDO CODE
// Traverses the tree, making sure that the tree has nodes
corresponding to the segments in segments[ ]
// Returns the LAST - LEAF node in the tree - matching the last segment
// This is the node with which a filter is associated
public FilterHierarchyNode Add(string[ ] segments)
{
    // start traversing at the root of the tree
    FilterHierarchyNode node = this.root;
    FilterHierarchyNode newNode;
    for (int i = 0; i < segments.Length; ++i)
    {
        string currentSegment = segments[i];
        // Does the current node have a child whose segment matches
        // the current one?
        if (null == (nextNode = node.GetChild(currentSegment)))
        {
            // No. Create a new node
            newNode = this.CreateNode(currentSegment);
            node.AddChild(newNode);
            // Keep traversing from the new node
            node = newNode;
        }
        else
        {
            // A suitable node already exists. Continue traversal
            node = nextNode;
        }
    }
    return node;      // corresponds to segments[segments.Length − 1]
}
```

Removing a filter from a filter tree is accomplished by locating a node associated with the filter and removing any reference to the filter and/or application data from the node.

If the node associated with the filter does not reference any other filter or application data, and if the node does not have any subordinate nodes, then the node is removed from the filter tree. A parent node of the removed node may also be removed if the previous node removal removes a last child node from the parent node and if the parent node does not reference any filter or application data. This removal process can be repeated up the filter tree until a node is reached that has a child node or references a filter and/or application data.

Exemplary Computer Environment

Figure 6:
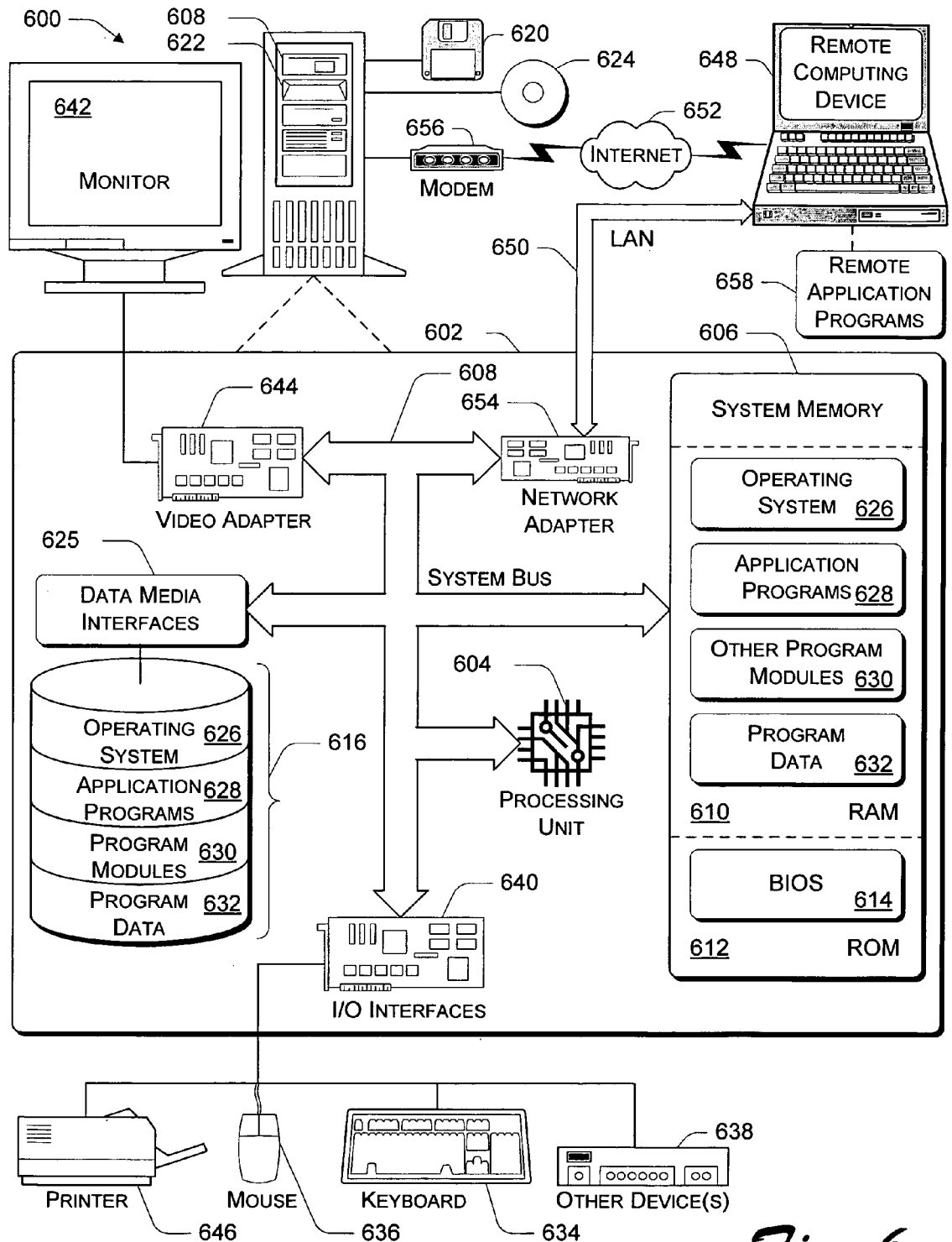
FIG. 6 is a diagram of an exemplary computing environment in which the implementations described herein may operate.

The various components and functionality described herein are implemented with a computing system. FIG. 6 shows components of typical example of such a computing system, i.e. a computer, referred by to reference numeral 600. The components shown in FIG. 6 are only examples, and are not intended to suggest any limitation as to the scope of the functionality of the invention. Furthermore, the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 602, a system memory 604, and a system bus 606 that couples various system components including the system memory to the processing unit 602. The system bus 606 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 604 includes computer storage media in the form of volatile and/or nonvolatile memory such as read only memory (ROM) 608 and random access memory (RAM) 610. A basic input/output system 612 (BIOS), containing the basic routines that help to transfer information between elements within computer 600, such as during start-up, is typically stored in ROM 608. RAM 610 typically contains data and/or program modules that are immediately accessible to and/or presently being operated on by processing unit 602. By way of example, and not limitation, FIG. 6 illustrates operating system 614, application programs 616, other program modules 618, and program data 620.

The computer 600 may also include other removable/non-removable, volatile/nonvolatile computer storage media. By way of example only, FIG. 6 illustrates a hard disk drive 622 that reads from or writes to non-removable, nonvolatile magnetic media, a magnetic disk drive 624 that reads from or writes to a removable, nonvolatile magnetic disk 626, and an optical disk drive 628 that reads from or writes to a removable, nonvolatile optical disk 630 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 622 is typically connected to the system bus 606 through a non-removable memory interface such as data media interface 632, and magnetic disk drive 624 and optical disk drive 628 are typically connected to the system bus 606 by a removable memory interface such as interface 634.

The drives and their associated computer storage media discussed above and illustrated in FIG. 6 provide storage of computer-readable instructions, data structures, program modules, and other data for computer 600. In FIG. 6, for example, hard disk drive 622 is illustrated as storing operating system 615, application programs 617, other program modules 619, and program data 621. Note that these components can either be the same as or different from operating system 614, application programs 616, other program modules 618, and program data 620. Operating system 615, application programs 617, other program modules 619, and program data 621 are given different numbers here to illustrate that, at a minimum, they are different copies. A user may enter commands and information into the computer 600 through input devices such as a keyboard 636 and pointing device 638, commonly referred to as a mouse, trackball, or touch pad. Other input devices (not shown) may include a microphone, joystick, game pad, satellite dish, scanner, or the like. These and other input devices are often connected to the processing unit 602 through an input/output (I/O) interface 640 that is coupled to the system bus, but may be connected by other interface and bus 11 structures, such as a parallel port, game port, or a universal serial bus (USB). A monitor 642 or other type of display device is also connected to the system bus 606 via an interface, such as a video adapter 644. In addition to the monitor 642, computers may also include other peripheral output devices 646 (e.g., speakers) and one or more printers 648, which may be connected through the I/O interface 640.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 606 via the I/O interface 640, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

CONCLUSION

The systems and methods as described thus provide an efficient way to match inputs against multiple filters by reducing a number of filters that must be tried against the input. Furthermore, the techniques describe provide an efficient way to sort and group filters so that a precedence algorithm may be applied.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method implemented at least in part by a machine, the method comprising:

receiving an input that includes hierarchical data;

traversing a filter tree according to segments of the hierarchical data to locate one or more matching nodes that correspond to the hierarchical data;

comparing at least a portion of the input to one or more filters tree associated with the matching nodes; and executing instructions associated with one or more filters tree satisfied by the input;

wherein the traversing further comprises:

comparing a first segment of the hierarchical data with a first node in a filter tree level that corresponds with a position of the first segment in the hierarchical data;

if the first segment does not match the first node, determining that the input does not match the first node;

if the first segment matches the first node and there is a subsequent second segment in the input, comparing the subsequent second segment to one or more second nodes in the filter tree that are subordinate to the first node; and if the first segment matches the first node and there is not a subsequent second segment in the input, determining that the input matches the first node.

2. The method as recited in claim 1, further comprising applying a precedence rule to the matching nodes, wherein the comparing step is performed on a subset of the matching nodes that is determined by the precedence rule.

3. The method as recited in claim 1, wherein a match node may be associated with instructions but no filter tree, in which case the input is deemed to match a filter tree for the match node, thereby resulting in execution of the instructions.

4. The method as recited in claim 1, wherein the hierarchical data further comprises a path that identifies a location in a hierarchical system.

5. The method as recited in claim 1, wherein:

a root node of the tree corresponds to a first segment of the hierarchical data;

a child node of the root node corresponds to a second segment of the hierarchical data; and a bottom-level node of the tree corresponds to a last segment of the hierarchical data.

6. The method as recited in claim 1, wherein each node of the filter tree references zero or more filters.

7. The method as recited in claim 1, wherein the hierarchical data further comprises a destination path identified by a segment string.

8. The method as recited in claim 7, wherein the input further comprises message data that is transmitted to a location identified by the destination path if the input satisfies a filter that is referenced by a filter tree node associated with the destination path.

9. The method as recited in claim 1, further comprising:

identifying the hierarchical data contained in the input; and parsing the hierarchical data into segments for use with matching.

10. A system, comprising:

memory;

a filter tree stored in the memory, at least one node of the filter tree referencing a filter;

a message input module configured to receive a message of hierarchical data that includes a path having one or more segments of hierarchical data;

a primary matching module configured to locate one or more filter tree nodes that match one or more of the segments;

a secondary matching module configured to identify any filters associated with the one or more matching filter tree nodes and to compare the message against the filters to determine if the message satisfies any of the filters; and a message processing module configured to execute instructions associated with any filter that is satisfied by the message;

wherein the secondary matching module is further configured to apply a precedence rule to the one or more matching filter tree nodes to derive a subset of the matching filter tree nodes and to identify only the filters associated with the subset of matching filter tree nodes.

11. The system as recited in claim 10, wherein the filter referenced by the at least one node further comprises a null filter that is deemed to be satisfied by any input message compared thereto, thereby resulting in the execution of instructions associated with the node referencing the null filter.

12. The system as recited in claim 10, wherein the message path is of a hierarchical nature and successive path segments correspond to successively subordinate levels of the filter tree.

13. The system as recited in claim 10, wherein the primary matching module is further configured to:

identify one or more path segments included in the message;

locate filter tree nodes associated with each path segment; and determine that each node located matches the message.

14. The system as recited in claim 10, wherein the primary matching module is further configured to:

identify one or more path segments included in the message;

locate filter tree nodes associated with each path segment; and determine that a node associated with a final path segment is the only node that matches the message.

15. The system as recited in claim 10, wherein the primary matching module is further configured to:

identify one or more path segments included in the message;

locate filter tree nodes associated with each path segment; and determine that a node associated with an initial path segment is the only node that matches the message.

16. A method, comprising:

receiving a data transmission requesting to add an entry to memory that stores multiple filters, the data transmission including at least a new filter, a segmented path identifying hierarchical reference data associated with the new filter, and at Least one data item associated with the new filter;

traversing a hierarchical data structure stored in the memory that is used to reference each of the multiple filters to determine if an existing location in the data structure matches the segment path included in the data transmission;

if an existing location is identified, adding a reference to the new filter to the existing location; and if an existing location is not found, creating a new location in the data structure, the new location being determined according to the hierarchical reference data and storing a reference to the new filter at the new location.

17. The method as recited in claim 16, further comprising storing a reference to the data item at the new location so that an input matching the new location can access the data item.

18. The method as recited in claim 16, wherein:
each of the multiple filters stored in the memory is associated with hierarchical reference data; and
the memory includes a filter tree data structure to reference the multiple filters according to the hierarchical reference data, each of the multiple filters being associated with a node in the filter tree data structure.

19. The method as recited in claim 18, wherein:
each segment of the segmented path corresponds to a node in the filter tree data structure so that a node associated with a filter corresponds with a final segment of the segmented path; and
each of one or more superior nodes to the node associated with the filter corresponds with a preceding segment of the segmented path.

20. A computer storage media containing computer-executable instructions that, when executed on a computer, perform the following steps:
receiving a data transmission that includes at least a message and a destination path that is structured according to a hierarchical protocol;
parsing the destination path into constituent segments;
comparing the destination path segments to a hierarchical data structure that is arranged according to the hierarchical protocol to determine one or more matching locations in the data structure that correspond with the destination path;
identifying one or more filters associated with the one or more matching locations;
testing the message against one or more filters referenced by the one or more matching locations; and
for each filter satisfied by the message, executing one or more instructions associated with the filter.

21. The computer storage media as recited in claim 20, wherein the hierarchical protocol is eXtensible Markup Language (XML) protocol.

22. The computer storage media as recited in claim 20, wherein the one or more filters are defined using Xpath.

23. The computer storage media as recited in claim 20, wherein the one or more instructions associated with the filter further comprise a destination to which at least a portion of the message is transmitted.

24. The computer storage media as recited in claim 20, wherein the destination path is a network address.

* * * * *